(No Model.)

H. B. DE BEAUMONT.
MAP.

No. 400,642. Patented Apr. 2, 1889.

Witnesses.
Chas H. Smith
J. Staib

Inventor.
Henry Bouthillier de Beaumont.
per Lemuel W. Serrell
Atty

UNITED STATES PATENT OFFICE.

HENRY BOUTHILLIER DE BEAUMONT, OF GENEVA, SWITZERLAND.

MAP.

SPECIFICATION forming part of Letters Patent No. 400,642, dated April 2, 1889.

Application filed October 15, 1888. Serial No. 288,184. (No specimens.) Patented in Belgium March 27, 1888, No. 81,202.

*To all whom it may concern:*

Be it known that I, HENRY BOUTHILLIER DE BEAUMONT, of Geneva, Switzerland, have invented a new and useful Map of the Earth, (for which a patent has been granted to me in Belgium, dated March 27, 1888, No. 81,202,) of which the following is a specification.

In the maps heretofore made showing the two hemispheres the continents and islands are considerably distorted, especially near the edges of the map. In my improved maps of the globe the meridians and circles of latitude are drawn in such a manner as to lessen the distortion of the continents and islands and to more correctly represent the earth's surface.

Figure 1:
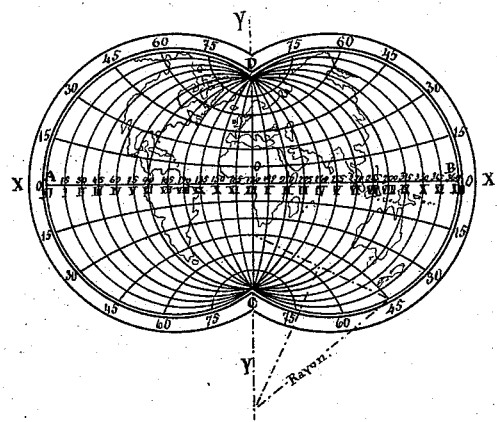
Figure 2:
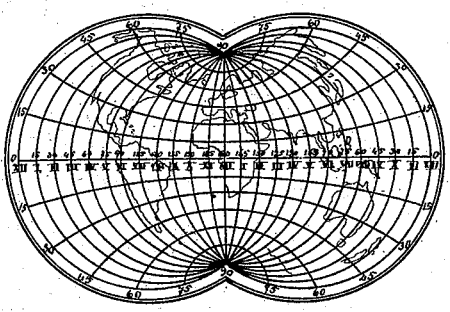

In the drawings, Figures 1 and 2 represent my maps of the earth's surface in a plane perpendicular to the equator.

Referring to Fig. 1, it will be observed that the equator A O B is divided into twenty-four parts, and the meridians are numbered with degrees, and also with the hours of the day, 0 of the degrees and 12 of the hours being at the right and left hand ends of the equator and 12 and 180° at the center of the equator, and through the center of the equator and at right angles to the same the meridian C O D is projected, C and D representing the north and south poles, and there are arcs of circles struck through the points in succession, C X D representing the boundary-arcs, around and parallel with which are other arcs inclosing the numbers indicating degrees of north and south latitude, so that the arcs C X D are divided into six equidistant spaces, the lines starting from these points on the margin passing through equidistant points upon the center meridian, C D. These lines divide up the map that represents the surface of the globe into spaces corresponding with the hours of the day and of the night, 15° corresponding to an hour, and the outlines of the continents and islands and the locations of different places are determined and made upon the map according to these meridian-lines and lines of latitude.

The map Fig. 2 corresponds to the map Fig. 1, except that in Fig. 2 the degrees of east and west longitude are numbered from the margins of the maps inwardly 15° apart up to the central meridian between C D, which is marked 180°. In Fig. 1 the dotted lines at Y indicate the manner in which to describe the respective arcs of circles by a chord drawn between two points, upon which a central perpendicular is erected that intersects the perpendicular upon the chord drawn between the two outer points, as well known in geometrical figures, and in this manner all of the arcs of circles upon my improved maps can be drawn by a compass with facility, and the lines denoting outlines of continents, islands, &c., are not as much distorted as they are in maps that represent the separate hemispheres.

I claim as my invention—

The map herein specified, representing the earth having a straight equatorial line and a central straight meridian perpendicular to the equator, and extending from the north to the south pole and dividing the representation of one hemisphere from the other, the boundaries of the maps and the meridians being arcs of circles, the meridian-lines being equidistant, or nearly so, at the equator and at the north and south latitude lines, which also are arcs of circles, substantially as set forth.

In testimony whereof I have signed my name to this specification in the presence of two subscribing witnesses.

HENRY BOUTHILLIER DE BEAUMONT.

Witnesses:
E. IMER-SCHNEIDER,
ALPH. BERNARD.